Patented Feb. 6, 1945

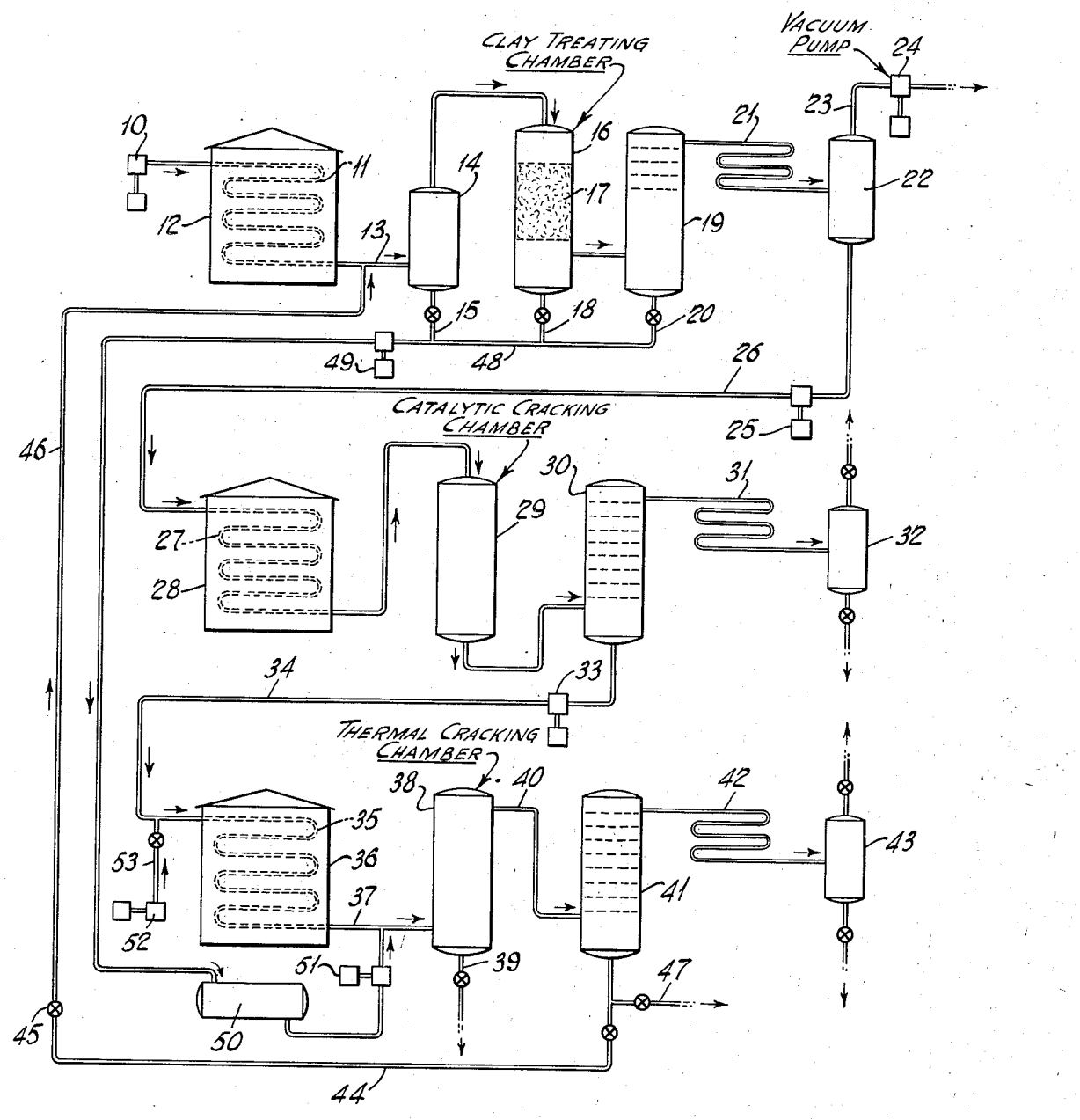

2,368,704

UNITED STATES PATENT OFFICE 2,368,704

TREATMENT OF HYDROCARBON OILS

Lawrence Carlson, Bloomfield, N. J., assignor to Texaco Development Corporation, New York, N. Y., a corporation of Delaware Application October 19, 1943, Serial No. 506,837

3 Claims. (Cl. 196—49)

This invention relates to the catalytic cracking of hydrocarbon oils and is concerned with the treatment of the charging stock to the catalytic cracking zone to improve the stock for catalytic cracking.

In accordance with the invention the charging stock is vaporized under a vacuum and the vapors are contacted with an adsorptive catalyst such as bentonitic clay or fuller's earth under conditions to effect polymerization of the more easily polymerizable constituents, the high boiling polymers are removed from the treated hydrocarbons and the latter are subjected to catalytic cracking. The vacuum treatment with the adsorptive catalyst functions to reduce the carbon residue of the charging stock and results in a reduction in the deposit of tar or coke on the catalyst in the catalytic cracking step, thus prolonging the life of the catalyst. The treatment with the adsorptive clay prior to the catalytic cracking step moreover makes possible a higher yield of gasoline in the catalytic cracking step.

Temperatures approximating 400° F. to 600° F. are the most effective temperatures for the polymerization to effect the removal of the more highly reactive olefins and to condition the oil for the subsequent catalytic cracking step. By vaporizing the charging stock under subatmospheric pressures oils of high boiling point may be treated in the vapor phase with the clay catalyst at the proper temperature.

The invention also contemplates a particular combination of vacuum clay treating, catalytic cracking and thermal cracking wherein hydrocarbon oil is vaporized under a vacuum and subjected to polymerization in contact with the clay catalyst, the treated hydrocarbons, after removal of the high boiling polymers, are subjected to catalytic cracking, high boiling products from the catalytic cracking operation are subjected to thermal cracking and reflux condensate, obtained from the thermally cracked products, is vaporized under a vacuum and the vapors are treated with clay prior to passage to the catalytic cracking step. The thermal cracking of hydrocarbon oil functions to effect disappearance of paraffins, to concentrate naphthenes and to produce olefins. Since the olefins and naphthenes are the most desirable hydrocarbons for catalytic cracking, the thermal cracking produces a stock well adapted for catalytic cracking. However, a portion of the olefins will normally be of the more highly reactive type tending to cause deposition of tar or coke on the catalyst. Consequently, the vacuum vaporization and clay treating which intervene between the thermal cracking step and the catalytic cracking step serve to provide for the catalytic cracking step a stock containing the olefins and naphthenes produced by the thermal cracking but with the elimination of the more reactive olefins which cause high carbon deposition on the catalyst.

For the purpose of more fully disclosing the invention reference is had to the accompanying drawing or flow diagram which illustrates a preferred embodiment thereof.

Charging stock, such as topped or reduced crude or gas oil, is introduced by a pump 10 to a heating coil 11 disposed in a furnace 12 wherein the oil is heated to a desired vaporizing temperature. In lieu of the furnace 12 the oil may be heated to the desired vaporizing temperature by heat exchange with hot cracked products from the catalytic or thermal cracking operations which are hereinafter described. The heated oil passes through a transfer line 13 to a separator 14 wherein any unvaporized material may settle out and be withdrawn through a line 15. The vapors pass to a clay treating tower 16 which contains a bed 17 of polymerizing catalyst such as bentonitic clay or fuller's earth. In practice a plurality of clay treating towers may be used to provide for regeneration or the use of fresh charges of clay without interrupting the continuity of the complete process. Liquid or high boiling polymers are withdrawn through a line 18 and the treated vapors pass to an after-fractionator 19 wherein any high boiling polymers or heavy ends contained in the vapors may be collected as liquid for removal through a line 20. The vapors pass through a condenser 21 thence to a receiving drum 22 wherein the condensate is collected. A gas line 23 extends to a vacuum pump 24 which serves to provide the desired subatmospheric pressure.

The oil is heated in the coil 11, usually to temperatures of the order of 500–600° F., and vaporization is effected under a sufficiently high vacuum to obtain the extent of vaporization desired under those temperatures. In the case of stocks having endpoints such as 700° F. to 800° F. substantially complete vaporization can be effected under subatmospheric pressures approximating 28–29 inches of mercury. It is preferred to avoid temperatures much in excess of 600° F. Since it is desired to contact the vapors with the clay catalyst at the temperatures most effective for the selective polymerization of the more highly reactive olefins and for accomplishing the beneficial purification or conditioning of the oil for the catalytic cracking, while avoiding cracking or conversion into lower boiling constituents during the polymerizing or purifying operation. It is preferable to contact the vapors with the clay with the vapors at the dew point so that the clay contacting may be conducted with the liquid refluxing which is desirable for long clay life.

Referring now to the catalytic cracking step, the condensate from receiver 22 is directed by a pump 25 through a line 26 to a heating coil 27 disposed in a furnace 28 wherein the oil is heated to the temperature desired for catalytic cracking. The heated oil is passed to a reaction chamber 29 wherein it is contacted with a catalyst adapted to catalyze a conversion to lower boiling products such as gasoline. Various catalysts, such as activated clays and synthetic silica-alumina catalysts may be employed. A preferred catalyst is a synthetic composite of precipitated silica and alumina, with or without added reactive agents, such as zirconia and molybdena. The catalyst may be provided as a stationary bed through which the vapors pass, or the vapors may pass over a continuously moving mass of granular catalyst, or the catalyst in a finely divided, comminuted or powdered form may be suspended in the vapors or the catalyst and vapors caused to flow through the reaction zone as a fluid. In the fixed bed method of catalytic cracking a plurality of catalyst chambers may be used so that the catalyst may be regenerated without interrupting the continuity of the process and in the case of the moving catalyst the catalyst may be removed from the contacting reaction zone to a regenerating zone. The vapors are contacted with the catalyst ordinarily at temperatures of 850–1050° F. under moderate superatmospheric pressures, generally not exceeding 100 p. s. i. and preferably below 50 p. s. i.

The products of the catalytic cracking pass to a fractionator 30 wherein they are fractionated to separate as residue or reflux condensate the higher boiling products from the naphtha or gasoline vapors. The vapors pass to a condenser 31 thence to a receiver or gas separator 32 wherein the catalytically cracked naphtha or gasoline is collected. The higher boiling products are preferably not recycled to the catalytic cracking zone and are subjected to thermal cracking prior to any further catalytic cracking.

Referring now to the thermal cracking step, the higher boiling products from the catalytic cracking operation are withdrawn from the fractionator 30 and are directed by a pump 33 through a line 34 to a heating coil 35 disposed in a furnace 36 wherein the oil is heated to the temperature desired for thermal cracking. The products from the heating coil are discharged through a transfer line 37 to a reaction chamber 38 which may be maintained at cracking temperature and wherein vapors separate from residue. Tar or liquid residue may be withdrawn through a line 39 and the vapors passed through a line 40 to a fractionator 41. In the fractionator the vapors are fractionated to separate higher boiling reflux condensate from gasoline or naphtha vapors which pass to a condenser 42 thence to a receiving drum or gas separator 43 wherein the thermally cracked gasoline or naphtha distillate is collected.

The thermal cracking step is preferably conducted in single pass, that is, without recycling within the thermal cracking unit, since recycling tends to increase aromaticity in the gas oil fractions. The desired disappearance of paraffins, concentration of naphthenes and formation of olefins can best be accomplished without recycling reflux condensate from the fractionator 41 to the heating coil 35.

The reflux condensate is withdrawn from the tower 41 through a line 44 and directed through a pressure-reducing valve 45 and line 46 to the separator 14 or preferably to the transfer line 13 so as to mix the reflux condensate with the heated stream from the coil 11 for vaporization therewith and so that these products from the thermal cracking operation may be subjected to the clay treatment under subatmospheric pressure prior to catalytic cracking. The temperature at the bottom of the tower 41 will normally be adequate to effect vaporization of the reflux condensate under the vacuum in the separator 14; in fact, sufficiently high temperatures, such as 700–800° F., may ordinarily be maintained in the bottom of the tower 41 to not only effect vaporization of the condensate upon the reduction of pressure but also to furnish heat to the stream from the coil 11 thus reducing the temperature required in the heater 12. A branch line 47 may be provided for withdrawing a portion or even all of the reflux condensate when it is not desired to recycle it for the vacuum clay treatment and subsequent catalytic cracking.

The lines 15, 18 and 20, provided for withdrawing heavy ends or polymers from the vacuum vaporizing and clay treating operation, communicate with a manifold line 48 and pump 49 by which the heavy ends or polymers may be directed to an accumulator 50. Liquid oil from this accumulator may be withdrawn by a pump 51 and injected into the stream of oil undergoing thermal cracking.

Raw charging stock may be introduced to the thermal cracking coil 35 by means of a pump 52 and line 53. Thus in one method of practicing the invention charging stock, such as topped crude or straight-run gas oil, may be subjected initially to thermal cracking and the gas oil recovered from the thermal cracking step, vaporized under a vacuum and the vapors subjected to clay treating, the treated product subjected to catalytic cracking and the higher boiling products from the catalytic cracking operation sent to the thermal cracking step for cracking with the original charging stock. In another method of practicing the invention charging stock, such as topped or reduced crude or straight-run gas oil, is vaporized under a vacuum, the vapors subjected to clay treating, the treated product subjected to catalytic cracking, higher boiling products from the catalytic cracking operation sent to the thermal cracking operation and reflux condensate from the thermal cracking operation subjected to vacuum vaporization, together with the fresh charge, so that the mixed straight-run and thermally cracked vapors may be subjected to clay treating and the treated product then directed to the catalytic cracking step.

In an example of the invention a gas oil stock having a boiling range of about 450–800° F. is heated for vaporization in the separator 14 at a temperature of 550° F. with practically complete vaporization under the low pressure therein. The vapors are contacted with fuller's earth at temperatures of about 550° F. The receiving drum 22 is maintained under a subatmospheric pressure of 25 mm. of mercury. The treated gas oil is subjected to catalytic cracking in contact with a synthetic composite of precipitated silica and alumina at a temperature of 950° F. under 35 p. s. i. The catalytic gas oil is subjected to thermal cracking at a temperature of 1000° F. in the heating coil and 910° F. in the reaction chamber under 400 p. s. i. Gas oil from the thermal cracking operation is mixed with the stream of vaporized gas oil passing to the clay contacting tower so that this thermally cracked gas oil is subjected to the vapor phase clay treatment together with the straight-run gas oil and the composite treated product directed to the catalytic cracking step.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the combination thermal and catalytic cracking of hydrocarbon oils the process that comprises passing gas oil hydrocarbons through a single pass thermal cracking zone wherein the hydrocarbons are subjected to cracking temperature under superatmospheric pressure, without recycling of thermally cracked products, to effect thermal cracking involving conversion into lower boiling hydrocarbons and formation of olefins, disappearance of paraffins and concentration of napthenes in the gas oil constituents, separating the resultant cracked products into vapors and residue, fractionating the vapors to separate gas oil from lower boiling products, directing said gas oil into a vaporizing zone maintained under subatmospheric pressure to effect vaporization of the gas oil constitutents, passing the gas oil vapors through a bed of adsorptive clay at a temperature approximating the dew point while under a sufficiently low subatmospheric pressure that the temperature of the vapors is also within a range of about 400° F.–600° F. and adapted for the selective polymerization of the more reactive olefins so that the vapors are contacted with the clay under conditions of liquid refluxing, contacting the treated gas oil with a cracking catalyst at a cracking temperature to effect conversion into lower boiling hydrocarbons, fractionating the products of the catalytic cracking to separate gas oil from lower boiling products, and directing the said gas oil to the aforesaid single pass thermal cracking zone.

2. In the combination thermal and catalytic cracking of hydrocarbon oils the process that comprises vaporizing charging stock containing gas oil in a vaporizing zone maintained under subatmospheric pressure to effect vaporization of gas oil constituents, passing the gas oil vapors through a bed of adsorptive clay at a temperature approximating the dew point while under a sufficiently low subatmospheric pressure that the temperature of the vapors is also within a range of about 400° F.–600° F. and adapted for the selective polymerization of the more reactive olefins so that the vapors are contacted with the clay under conditions of liquid refluxing, separating the resultant higher boiling polymers, contacting the treated gas oil with a cracking catalyst at a cracking temperature to effect conversion into lower boiling hydrocarbons, fractionating the products of the catalytic cracking to separate higher boiling hydrocarbons from lower boiling products, passing such higher boiling hydrocarbons through a single pass thermal cracking zone wherein the hydrocarbons are subjected to cracking temperature under superatmospheric pressure, without recycling of thermally cracked products, to effect thermal cracking involving conversion into lower boiling hydrocarbons and formation of olefins, disappearance of paraffins and concentration of naphthenes in the gas oil constituents, fractionating the thermally cracked products under superatmospheric pressure to separate higher boiling hydrocarbons from lower boiling products, expanding higher boiling hydrocarbons from the thermal cracking step into the aforesaid vaporizing zone for vaporization with the charging stock under subatmospheric pressure and contacting with the adsorptive clay.

3. In the combination thermal and catalytic cracking of hydrocarbon oils the process that comprises vaporizing a residual charging stock containing gas oil in a vaporizing zone maintained under subatmospheric pressure to effect vaporization of gas oil constituents, passing the gas oil vapors through a bed of adsorptive clay at a temperature approximating the dew point while under a sufficiently low subatmospheric pressure that the temperature of the vapors is also within a range of about 400° F.–600° F. and adapted for the selective polymerization of the more reactive olefins so that the vapors are contacted with the clay under conditions of liquid refluxing, separating the resultant higher boiling polymers, contacting the treated vapors with a cracking catalyst at a cracking temperature to effect conversion into lower boiling hydrocarbons, fractionating the products of catalytic cracking to separate higher boiling hydrocarbons from lower boiling products, passing such higher boiling hydrocarbons through a single pass heating coil wherein the hydrocarbons are subjected to a cracking temperature without recycling of thermally cracked products, combining residual constituents from said vaporizing zone and polymers from the clay treating zone with the effluent from said heating coil to subject the combined constituents to thermal cracking, separating the thermally cracked products into vapors and residue, fractionating the separated vapors to separate gas oil constituents from lower boiling products, and directing said gas oil constituents to the aforesaid vaporizing zone for vaporization with the charging stock under subatmospheric pressure and contacting with the adsorptive clay.

LAWRENCE CARLSON.